United States Patent [19]

Pharris et al.

[11] Patent Number: 4,907,212
[45] Date of Patent: Mar. 6, 1990

[54] METHOD AND APPARATUS FOR CALIBRATING AN OPTICAL DISK SYSTEM

[75] Inventors: Kenton J. Pharris; David L. Schell, both of Colorado Springs, Colo.

[73] Assignee: Laser Magnetic Storage International Company, Colorado Springs, Colo.

[21] Appl. No.: 204,697

[22] Filed: Jun. 9, 1988

[51] Int. Cl.⁴ .............................................. G11B 7/00
[52] U.S. Cl. ...................................... 369/45; 369/53; 369/54; 369/55; 369/58
[58] Field of Search .................................... 369/43–47, 369/53–58, 32, 33; 358/342; 356/237, 243

[56] References Cited

U.S. PATENT DOCUMENTS

| | | | |
|---|---|---|---|
| 4,571,712 | 2/1986 | Romano et al. | 369/46 X |
| 4,571,714 | 2/1986 | Mathews et al. | 369/44 |
| 4,577,301 | 3/1986 | Mathews et al. | 369/44 |
| 4,621,351 | 11/1986 | Baer et al. | 369/44 X |
| 4,832,487 | 5/1989 | Mikuriya et al. | 369/53 X |

Primary Examiner—Robert L. Richardson
Attorney, Agent, or Firm—Sheridan, Ross & McIntosh

[57] ABSTRACT

Calibration of read timing, write timing and focus is accomplished automatically by comparing reflectance signals. The timing or focus settings are preferably modified, and signals are again compared under the modified adjustment settings. The read timing adjustment includes comparing signals from mark positions immediately preceding and immediately following an isolated mark and adjusting read delay to achieve small or minimum differences between the signals at the mark positions immediately preceding and immediately following the isolated mark bit position. Focus calibration is accomplished by comparing the value of the signal from a mark with the value from a mark position immediately adjacent the mark and adjusting the focus offset until a larger maximum difference between the two signals is achieved. The write timing calibration is preferably achieved by causing the write circuitry to emit a low-power light beam in the vicinity of an unwritten mark position and adjusting the write timing delay circuitry until a low or minimum signal, i.e. high reflectance, is achieved at a desired mark position.

29 Claims, 5 Drawing Sheets

METHOD AND APPARATUS FOR CALIBRATING AN OPTICAL DISK SYSTEM

FIELD OF THE INVENTION

The present invention relates to apparatus and method for calibrating an optical disk system and particularly to automatic calibration of the read timing, focus and write timing of an optical disk data storage system.

BACKGROUND INFORMATION

A typical optical disk system contains a number of adjustment points that affect operation of the system. Examples of these include adjustment for the read timing, i.e. the points in time at which the read circuitry detects or stores values of the read signal, write timing, i.e. points in time at which the write circuitry initiates a write pulse and focus offset, i.e. a signal for adjustment of the lens or other focusing system which is intended to be added to a focus servo signal such that the resulting summed signal is operative to focus a read or write beam on the storage medium. Proper adjustment of such adjustment points is required for reading and writing optical disk marks, i.e. optically detectable characteristics of small areas of the disk which can be used to store bits of data. Items which can be used as marks can include holes, pits, amorphous areas, or magnetized areas.

Typical optical disk systems contain one or more servo systems to maintain clock synchronization or focus fineness. Examples include systems described in U.S. Pat. No. 4,290,122 issued Sept. 15, 1981 to Bates, et al., U.S. Pat. No. 4,257,709 issued Mar. 24, 1981 to Mostyn, Jr., and U.S. Pat. No. 4,238,843 issued Dec. 9, 1980 to Carasso, et al. Such systems typically are not useful for providing a calibration of the respective systems because they operate only within a narrow "capture" range and thus the systems must be calibrated before such servo systems become operable. Furthermore, such systems are designed for continuous operation to maintain an already established state of synchronization or focus and thus must operate on a rapid time-basis so as not to interfere with the recording or extraction of data which is occurring simultaneously or on a time-shared basis with such servo systems. Therefore, optical disk systems require establishment of offset values or adjustment of certain adjustment points to bring the system within minimum tolerances which will enable the desired recording or extraction of data and the associated operation of servo systems.

Adjustment of such offset values or adjustment points is typically done at the manufacturer's facility before shipment to a customer or upon installation of the system at the customer's site or during service of the equipment at the customer's site. The adjustment is typically done manually by a technician or service person. Such manual adjustment requires specialized equipment and the services of a skilled technician and thus requires technician training. Because of the expense and difficulty of such manual adjustment, such adjustment is typically done only when the equipment is shipped or installed or when specifically required because of a failure of some part of the system. However, even when the initial adjustment is done correctly, changes in the components of the system such as deterioration of or changes in electronic components, or misalignment of mechanical or optical components from vibrational, thermal or other sources, will cause the original adjustments to be less than optimal after a period of use. The less-than-optimal adjustment settings can contribute to an increase in error rates or other difficulties which may be simply tolerated until such time as the error rate reaches a level where service becomes necessary and the adjustment points are readjusted by a service person.

Adjustment is typically achieved by directly connecting test equipment such as an oscilloscope to particular lines or points in the circuitry. The technician or service person then views the output of the test equipment, such as the trace of a signal on an oscilloscope, while the system is operating. The technician has been trained to recognize which aspects of the test equipment output indicate a properly adjusted parameter and which types of outputs indicate that an adjustment is needed. Based on his training and experience, the service person then makes an adjustment to the system by, for example, adjusting a delay line in the read or write circuitry or adjusting the focus offset. This process is repeated until the technician, relying on his judgment and experience, is satisfied that a proper adjustment has been accomplished.

Typically, previous calibration processes were conducted in the context of a continuous servo system, as opposed to a servo sector or servo byte system. In a continuous servo system, a timing or clock signal is pre-recorded onto the disk. A common method of providing such timing signal was to provide grooves with periodically, e.g. sinusoidally, varying depth. Typically, such systems do not have particular sectors or areas of the disk which are reserved, i.e. in which the position or absence of marks is known. Therefore, calibration was conducted using not marks, but rather, using the pre-recorded clock signal. The phase of the pre-recorded clock signal could be detected and the timing of a separately generated read clock signal could be adjusted, for example, by manually selecting a delay tap in a delay circuit to shift the generated read clock signal to a desired phase relationship with respect to the pre-recorded clock signal.

As an example, a technician typically would connect the leads of an oscilloscope to obtain values indicative of the magnitudes of points on the prerecorded clock signal. These points were selected in relationship to the read clock signal, for example, points lagging a read clock signal edge by one-half cycle and points leading the edge by one-half cycle. It was known that if the pre-recorded signal peaks corresponded in time to the read clock signal edges, such leading and lagging points on the pre-recorded signal would have substantially the same magnitude. The technician would compare the signals indicating leading points and lagging points and if these values were not substantially equal, would manually change the delay line tap until these values became substantially equal.

A number of difficulties were consequent upon this method of calibration. First, because the position of marks on the disk is unknown in a continuous servo system, it was typically necessary to install a new unwritten disk into the system before conducting the read timing calibration in order to be sure the signal indicated only the pre-recorded clock signal and not marks. Because replacement of the disk was typically required, the calibration could not be conducted automatically but required the services of a technician. Secondly, the previous calibration method required that a clock signal be pre-recorded on the disk. Furthermore, such a pre-recorded clock signal typically provides a low amplitude signal with a relatively low signal-to-noise ratio. Because of the low amplitude of the signal, in order to obtain measurable and useful values, the distance from the leading and lagging points to the pre-recorded peak was typically less than the distance between the center of the mark positions, i.e. the positions on the disk where, according to the code or scheme being used, marks can be written on the disk. For this reason, it was not feasible to use the mark reading circuitry in the calibration system. Rather, it was necessary to use special test or calibration equipment or circuitry. Because calibration required the services of a technician, there was no purpose or advantage in using other than manually-adjustable delay circuits, and in particular, there was no reason to develop or use a programmable delay.

Thus, previous read calibration systems could not be conducted automatically but required the services of a technician, were conducted in the context of a disk with a pre-recorded clock signal, required a disk in which at least an area was known to be unwritten, and typically required installation of a clean or unwritten disk, and required the use of special test or calibration equipment and could not use the already-available mark reading apparatus or circuitry.

Previous write timing calibration methods also had a number of undesirable features. In the context of a continuous servo system, write calibration was conducted by using write clock signal to write marks into a first area or sector of the disk. The marks were then read and the amplitude of the reflected signals noted. Next, the delay taps were manually adjusted to provide a different write clock phase, marks were written into another area of the disk, and the resulting amplitude was noted. The process was repeated until it was found which delay amount resulted in the greatest decrease in reflectance, i.e. the minimum reflectance. Thus, according to previous methods, sectors of the disk were written onto or sacrificed each time new delay line configurations were tested. A single calibration could require writing on and sacrifice of a plurality of disk sectors. For this reason, it was infeasible to conduct a write timing calibration on a frequent basis, for example, on each power up of the system. Furthermore, it was necessary to conduct the write timing calibration only when a disk had been installed which was known to contain unwritten sectors and usually required installation of a new or unwritten disk.

The initial set up for calibration of the focus setting was typically conducted in previous systems by monitoring the output of the optical detector, such as a quadrature-type detector, while the focus setting was adjusted. Starting from an optimally adjusted focus setting, the focus setting can be adjusted away from the optimal in either of two directions. Typically, a technician would adjust the focus setting in a first direction until a drop off in amplitude at the optical detector was noted and the focus adjustment at this drop off was noted. Next, the technician would adjust the focus in the second or opposite direction until, again, a drop off in the detected signal at the optical detector was obtained and the focus adjustment at this point was again noted. The technician would then set the focus adjustment or offset to a position about midway between the two noted positions, i.e. midway between the points at which the optical detector displayed a drop off in the two focus adjustment directions.

As with the read and write adjustments, the focus adjustment had to be conducted on a portion of the disk which was known to be unwritten, and usually required installation of a new or unwritten disk. For this reason, the focus calibration could not be conducted automatically. Furthermore, this focus calibration method did not directly measure or necessarily result in the sharpest focus, but rather, merely represented a midpoint between two unfocused positions.

Previous optical systems have provided indications of signal strength in an analog fashion, i.e. in which an electrical signal, usually continuous, is provided which is analogous to or provides an indication of the status of another system, such as reflectance of a light signal. In order to work with such systems to adjust the adjustment points as described, relatively expensive equipment and circuitry is required such as sample and hold circuits, high speed comparators and/or oscilloscopes. Sample and hold circuits commonly used in processing analog signals suffer from common deficiencies including a "droop" or drop off of the output signal with time, and "offset errors" which occur when several sample and hold devices are used which differ slightly from each other in response characteristics. Further, analog systems are most conducive to sampling a single bit position at a time and in order to produce an indication of an average value require relatively expensive analog averaging circuitry.

Thus, several advantages could be obtained from the development of a calibration apparatus and method which involves self-calibration, i.e. automatic calibration without the need for judgment or adjustment by skilled technicians. In that regard, the present invention is directed to providing method and apparatus for calibrating adjustment points in an optical disk system which can be conducted by components of the system itself at any time calibration is desired without the need for adjustment by a skilled technician.

SUMMARY OF THE INVENTION

According to the present invention, calibration of adjustment points e.g. read timing, write timing and/or focus offset, is accomplished automatically including selecting an initial "trial" adjustment point setting, comparing signals from different mark positions, immediately preceding and immediately following an isolated mark, i.e., a mark for which the immediately preceding and following mark positions are unwritten, and do not contain marks. The read delay is adjusted to achieve small or minimum difference between the signals at the bit positions immediately preceding and immediately following the isolated mark. Focus calibration is preferably accomplished by comparing the value of a signal at an isolated mark with the value at a mark position immediately preceding (or immediately following) the isolated mark and adjusting the magnitude of the focus offset until a large or maximum difference between the signal at the isolated mark and the signal at the mark position immediately preceding (or following) is achieved. The focus offset is then added to the focus servo signal during normal operations. The write timing calibration is preferably achieved by causing the write circuitry to emit a low-power light beam in the vicinity of an unwritten mark position and adjusting the write timing delay circuitry until a low or minimum signal (corresponding to a high or maximum light reflectance) is achieved.

Preferably, calibration involves selection of an adjustment point setting from among a plurality of possible settings. In such a case, the precision or fineness of control is related to the number of possible settings. In such a case, the precision or fineness of control is related to the number of possible settings and/or the interval between possible settings. Preferably, the interval for the read and write timing calibrations is about 1/32 of the period between successive mark positions, and the interval for focus calibration is such as to cause movement of the objective lens of about 0.1 micron to 0.05 micron.

The calibration is automatic or self-calibration in the sense that it can be conducted entirely by machine, without the need for judgment or adjustment by a skilled technician. Because the calibration is automatic, calibration is not limited to shipment, installation or service of the equipment but can be done at other times such as upon detection of an electronic event, for example upon every power-up of equipment. The calibration is preferably done at each activation, i.e power-up, of the optical disk system and before the first user access to the system following each such activation. Calibration can also be done at other times such as at predetermined intervals, upon user or host-computer command, or upon detection of a condition such as a high error rate or a pre-determined temperature condition. The calibration system of the present invention preferably is based on comparison of digitally stored values, and can use portions of circuitry which are already provided for other purposes, thus providing lowered equipment costs. The digital system avoids the droop and offset error disadvantages of sample and hold circuitry and the high cost of sample and hold, high speed comparator and analog averaging circuitry.

DETAILED DESCRIPTION OF THE PREFERRED EMBODIMENTS

The present invention is directed to calibrating adjustment points in an optical disk system such as read timing delay, focus offset and write timing delay adjustment points. The calibration includes comparing values of reflectance signals corresponding to reflectance in the vicinity of two or more mark positions and adjusting the adjustment points based on the results of such comparison. The comparison involves obtaining a value related to reflectance near a mark position whose value (1/0 or written/unwritten) is known. This is conveniently done in the present invention by obtaining a reflectance value in the vicinity of a servo mark. Servo marks are provided on optical disks according to a number of systems including continuous servo marks or discrete servo blocks or sectors. The present invention will be described in connection with a particular servo block or servobyte configuration, although the described self-calibration could be applied mutatis mutandis to other optical disk systems in which the position of a written mark or an unwritten mark position is known, such as other types of servo bit systems.

Figure 1:
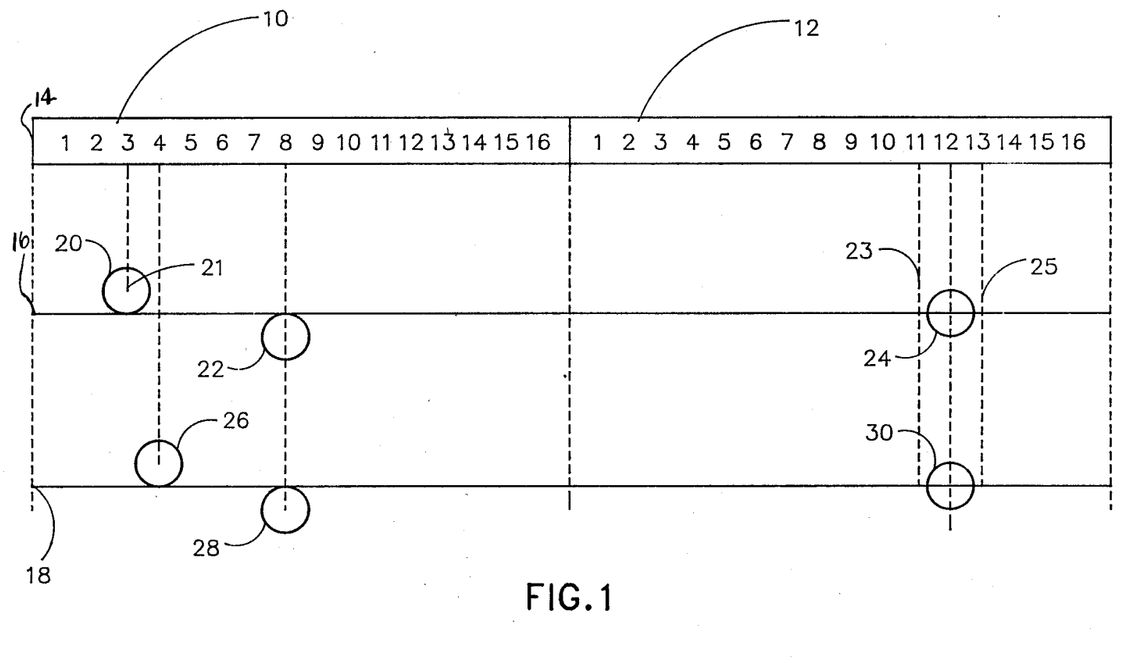
FIG. 1 is a schematic depiction of the arrangement of marks and mark positions in a servo block of a disk.

Referring to FIG. 1, a portion of a servo block is schematically depicted, which includes first and second contiguous servo bytes 10, 12, each having 15 bit positions 14 numbered, in FIG. 1, 1-15. Two tracks 16, 18 are depicted. In the particular servo system depicted, servo byte one 10 is provided with exactly two written marks and servo byte two 12 is provided with exactly with 1 mark. The upper track 16 depicted in FIG. 1 contains a first written mark 20 at mark position 3 of the first servobyte 10 which is offset to one side of the track center 16. As depicted in FIG. 1, the mark 20 is substantially circular and has a center 21. Marks contain other shapes including elliptical. The first track contains a second written mark 22 at mark position 8 of servobyte one 10 which is offset from the track center 16 in a direction opposite to the offset of the mark 20 at mark position 3.

In the following, for convenience, marks will be discussed in the context of a system in which a mark corresponds to an area of decreased reflectance. Application to systems in which marks correspond to other disk characteristics will be readily understood by those skilled in the art by making appropriate adjustments.

The marks 20, 22 at positions 3 and 8 are offset to assist in providing signals which indicate whether the read/write beam is tracking properly along the data track 16. Although this aspect is not critical to the invention, briefly, if the beam is tracking properly along the center of the track 16, the reflectance at mark position 3 will be equal to the reflectance at mark position 8. If the beam is tracking to one side of the track center 16, e.g. above the track center 16 in FIG. 1, the signal corresponding to the mark 20 at position 3 will show a larger drop in reflectance than the signal at the mark 22 at mark position 8. Thus, if mark position 3 is detected as having a reflectance loss greater than that at mark position 8, tracking can be corrected downward or towards mark position 8.

The mark 24 written in the second servobyte 12 is centered on the track center 16 and is written at mark position 12. Because the distance between the 22 at mark position 8 of servobyte one 10 and the mark 24 at mark position 12 of servobyte two 12 is a known quantity, the times of occurrence of detection of these two marks can be used to provide or to synchronize a clock signal such as by a phase lock loop system.

The lower track 18 depicted in FIG. 1 is identical to the upper track except that the first written mark 26 of servobyte one 10 is written in mark position 4 rather than mark position 3. The location of the first mark in the first servo- byte 10 at either mark position number 3 or mark position 4 can be used to indicate that a servo block is being read.

The above-described servobyte system thus provides mark positions on the disk which are known to be written. Preferably, at least some of the known mark positions are isolated marks.

Figure 2:
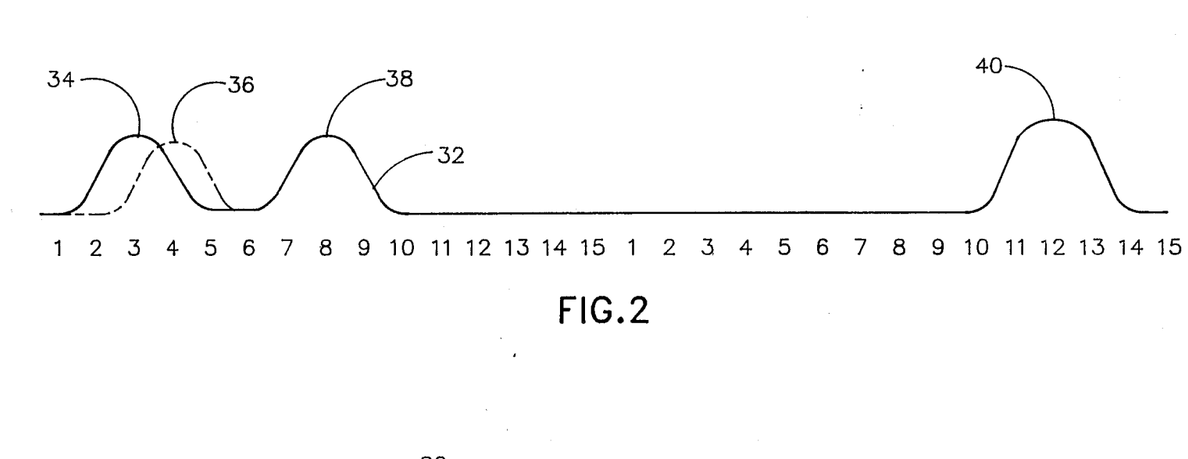
FIG. 2 is a diagram of an idealized reflectance received from a servo block, with reflectance decreasing upward in the diagram.

Referring now to FIG. 2, there is depicted a schematic representation of a signal 32 indicative of reflectance of a read beam from the surface of a medium when the read beam passes along the first or second tracks through the servobytes depicted in FIG. 1. The diagram of FIG. 2 is arranged so that light reflectance decreases upward in the diagram, i.e. the peaks 34, 36, 38, 40 of the signal 32 represent drops or decreases in reflectance such as that caused by the read beam falling upon the marks 20–30 of the servobytes 10, 12 depicted in FIG. 1. The signal defined by the first, third and fourth peaks 34, 38, 40 corresponds to reflectance from a read beam along the first track 16. The signal defined by the second, third and fourth peaks 36, 38, 40 (shown with a dotted line) corresponds to reflectance from a read beam along the second track 18. The signal 32 depicted in FIG. 2 is somewhat idealized and does not indicate the noise component which is commonly superimposed on such a signal. It will be noted that even though the holes 20–30 are relatively sharp-edged, the peaks 34, 36, 38, 40 have a normal or gaussian distribution shape. The width of the peaks 34–40 are such that there is some amount of reflectance drop at portions of the signal corresponding to neighboring mark positions, i.e. even though a an isolated mark 24, 30 is written in mark position 12 of the disk, some amount of reflectance drop occurs in the vicinity of mark positions 11 and 13.

The signal 32 depicted in FIG. 2 represents a continuous signal such as would be obtained by continuously detecting reflectance from a light beam as it traveled along one of the track centers 16, 18 depicted in FIG. 1. However, extraction of the information recorded on the disk requires that the presence or absence of marks at discrete locations, i.e. the mark locations of the disk, be detected. One manner of accomplishing such detection is to provide a clock signal which is synchronized with the positioning of the light beam exactly over the mark positions. Using such a clock signal, the magnitude of the reflectance signal 32 at each clock signal can be obtained, thus providing an indication of reflectance at each mark position. As explained above, the known number of mark positions between mark position 8 of servobyte 1 and mark position 12 of servobyte 2 can be used to drive or synchronize a phase lock loop system which will output a clock signal having the proper frequency, i.e. such that the period of time between two clock signals is exactly equal to the period of time required for the light beam to move from one mark position to an adjacent mark position. (In actuality, the light beam is fixed with respect to the track dimension of the optical disk system and the marks move past the light beam as the disk is rotated). The detection of marks 8 and 12 from servobytes 1 and 2 can also be used to adjust the phase lock loop system during operation of the optical disk system, e.g. to account for variations in rotation speed of the disk.

Although the phase lock loop system described above can be used to provide a clock signal with the required frequency, the phase of the clock signal is not necessarily correct, i.e. although the time period between clock signals equals the time required to move the light beam from one mark position to an adjacent mark position, the clock signals may not occur exactly when the light beam is located at the centers of the mark positions. To correct this, the phase of the clock signal can be adjusted by delaying the clock signal. The delay can be achieved by passing the clock signal through a programmable delay circuit such as a delay line with a plurality of taps, each tap representing a different amount of delay and the tap for output of the signal being programably selectable. Selecting the correct delay so that the clock signals occur when the read beam is aligned with the centers of mark positions is what is meant by calibrating the read signal.

In many systems, the write beam, i.e. the light beam operated at an intensity to form a mark such as by forming a hole in the medium, is controlled by write timing circuitry. It is normally desired that when a mark is to be written in the medium, the mark should be centered on a bit position. However, it is normally not desirable to control the write beam timing to coincide exactly with the read timing. This is because of a number of characteristics of a write-intensity laser, including the fact that some amount of time is needed to initiate emission of the write-intensity power level and some further time is needed before the heating of the medium results in formation of a mark. Thus, the write timing control circuitry may need to be out-of-phase with respect to the read timing clock signal. This can be conveniently accomplished by delaying the write timing clock signal such as by passing the write timing clock signal through a programmable delay circuit. Selecting the correct delay so that the write timing clock signals occur at such time as to produce written marks which are centered on the desired mark positions is what is meant by calibrating the write signal.

The read/write beam which impinges on the disk medium is preferably provided with a desired sharpness of focus both in order that the size of the beam at the surface of the medium should be as small as desired, and in order for the focus condition of the reflected beam, to be within the necessary bounds. Optical disk systems are often provided with a type of focus servo or feedback such as that described in U.S. Pat. No. 4,464,741 issued Aug. 7, 1984 to Compaan. However, it is not always desirable to use such a focus servo for calibration purposes, for at least two reasons. First, the focus servo system has a relatively narrow "capture" range, i.e. the focus system must be relatively close to an in-focus condition before the focus servo system is operative. Second, the focus servo system may, by itself, produce a stable but somewhat out of focus condition at the disk. For example, in an astigmatic focus system, the focus servo will produce a stable focus condition at which the reflected light beam has a particular shape at the focus detector apparatus. However, this focus condition, although stable may not be the focus condition which is desired at the disk. In order to convert the stable, slightly out of focus condition to a stable infocus condition, the focus servo signal must be combined with an offset signal to provide a focus control signal which will produce the desired focus condition. Providing a focus setting which places the focus system within the capture range of the servo system and, where desired, selecting a focus offset to produce a desired read/write degree of focus in response to a focus-servo focusing signal is what is meant by calibrating the focus. Typically both a focus servo and a focus offset are needed in order to provide the desired degree of focus. As noted above, it is not practical, for most applications, for the servo system to calibrate or provide the offset. Similarly, the calibration method is typically too slow to act as the focus servo in an operational mode.

Figure 3:
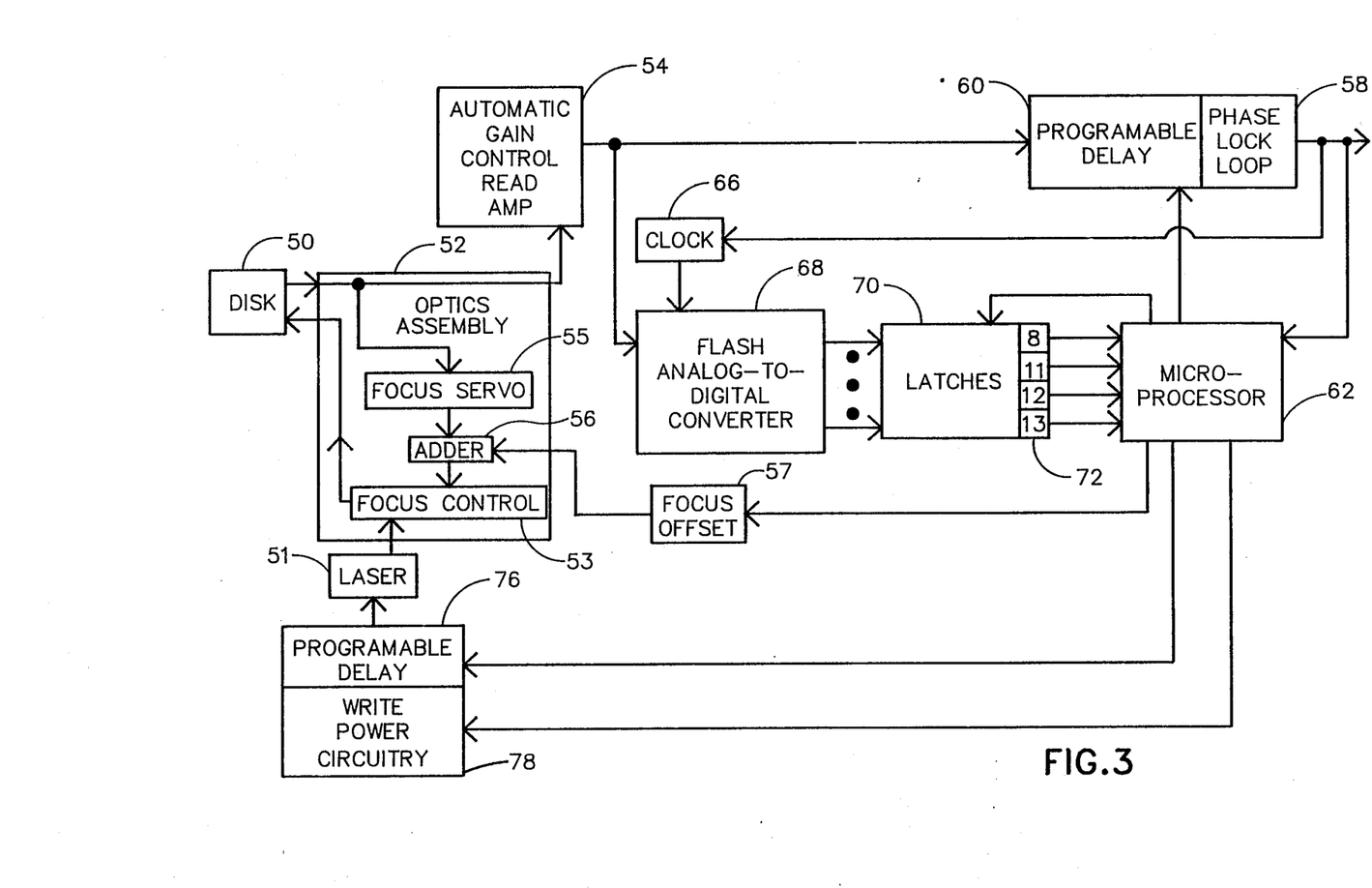
FIG. 3 is a schematic block diagram of components of an optical disk system in accordance with the present invention.

Referring now to FIG. 3, a number of components used in the context of the present invention are depicted in schematic block diagram form. The medium on which data is recorded can be provided in a number of forms but the present invention will be described in the context of media in the form of a rotatable disk 50. A light source such as a laser 51 produces a light beam which passes through an optic assembly 52. The optic assembly 52 can include beam splitters, wave plates, gratings, lenses, and other well-known optical components. The optics assembly 52 causes a beam of preferably polarized and preferably coherent light to fall on the data recording medium of the disk 50. Specifically, the optics assembly 52 contains a focus control 53, such as a voice-coil controlled objective lens which is controlled, as described below to focus light received from the laser 51 to produce a focused spot of a desired size on the recording medium of the disk 50. As the disk 50 rotates, the focused spot defines a substantially circumferential, i.e. circular or spiral-shaped, path on the disk. At least a portion of the light reflects from the disk 50 and passes through the optics assembly 52 and may pass through some of the same optics assembly components which acted on the light beam prior to its impingement on the disk 50. The reflected light beam is used to produce one or more signals for retrieving data recorded on the disk 50, providing tracking or focus servo information or other functions. Many configurations and types of lasers 52, optics assemblies 54 and disks 50 can be used, including, by way of example, the configurations described in U.S. Pat. No. 4,646,281, issued Feb. 24, 1987 to Verboom, and U.S. Pat. No. 4,464,741, issued Aug. 7, 1984 to Compaan both incorporated herein by reference. In the embodiment depicted in FIG. 3, the optics assembly 52 provides an electrical signal related to characteristics of the reflected beam and this signal is provided to an automatic gain control read amplifier 54 and a focus servo system 55. The focus servo system can use any well-known type of focusing, such as astigmatic focusing, as described in e.g., the Compaan patent. The focus servo signal is conveyed to an adder circuit 56 where it is additively combined with an offset, provided by a focus offset device 57. The focus offset device 57, which can be, for example, a digital-to analogue converter, provides a focus offset signal of a magnitude which is controlled by the microprocessor 62, in a manner described below. The combined focus offset signal and focus servo signal is output by the adder 56 as a focus control signal for controlling the focus control device 53.

The output of the amplifier 56 is used for a number of purposes. One purpose is to provide an input signal to the phase lock loop circuitry 58 which in turn is used in obtaining values related to reflectance from the disk 50 at bit positions of the disk 50. As described above, the phase of the phase lock loop 58 is adjustable by a programmable delay 60. Although in FIG. 3 the programmable delay 60 is depicted as preceding the phase lock loop 58, the programmable delay 60 in some configurations may follow the phase lock loop 58. The amount of delay created by the programmable delay 60 is set by the microprocessor 62 which can be any microprocessor capable of performing the calculations described below and is preferably a microprocessor which is also used for other aspects of the optical disk system such as converting the optical disk data code, e.g. a four-out-of-fifteen, to a data code for eventual transmission to the host computer (not shown).

The calculations described below conducted by the microprocessor 62 include calculations based on the output from the amplifier 54. The output from the amplifier 54 is normally in a continuous form similar to that illustrated by the signal 32 depicted in FIG. 2. As described above, a plurality of discrete values representing magnitudes of the continuous signal from the amplifier 54, which desirably correspond to times when the light beam is aligned with the centers of bit positions on the disk 50, are extracted from the continuous signal. The points in time at which magnitudes are extracted from the continuous signal are determined by the clock 66. The clock 66 is at least partly controlled by the output of the phase lock loop circuitry 58 and the clock 66 provides a read clock signal which has a frequency and a phase determined by the phase lock loop circuitry 58 and the programmable delay 60. The clock 66 provides input to an analog to digital converter 68 for providing digital representations of the magnitude of the continuous analog signal which is output by the amplifier 54. The analog to digital converter 68 is preferably a flash-type converter which outputs a plurality of digital values simultaneously. Preferably, the converter 68 is a device which is also used in connection with reading data recorded on the disk 50 in addition to its use in the system for providing calibration, as described herein.

The plurality of digital values is transmitted to an array of latches 70. The latches 70 can be configured to select, from among the plurality of digital values provided by the converter 68, a fewer number of digital values preferably related to reflectances at desired mark positions. The latches 70 can be provided in a form such that the mark positions to be selected are controlled by the microprocessor 62. In this way, the latch array 70 used in the present invention can be the same latch array which is used by the optical disk system in reading data recorded on the disk 50, for example by causing the microprocessor 62 to configure the latches 70 in such a way as to select the two highest-magnitude odd-position marks and the two highest-magnitude even-positioned marks, as described, e.g. in U.S. Pat. No. 4,599,717 issued Jul. 8, 1986 to Bracht, et al. By using a converter 68 and latch array 70 which is useful both in connection with the calibration described herein and in connection with reading data from the disk 50, an optical disk system can be provided which requires fewer parts than would otherwise be the case.

As depicted in FIG. 3, during calibration, the microprocessor 62 configures the latch array 70 to select digital values corresponding to the eighth mark position 22, 28 of the first servo byte 10, and the eleventh, twelfth and thirteenth mark positions 23, 24, 25 of the second servobyte 12. The particular position selection depicted in FIG. 3 relates to the servobyte configuration depicted in FIG. 1 but, as will be apparent to those in the art, other mark position selections can be used particularly for other servo configurations. The particular position selection depicted in FIG. 3 also relates to the read timing calibration, as described below. Other mark position selections will be made by the microprocessor 62 in connection with the focus calibration and the write timing calibration, described below. The digital magnitudes corresponding to mark positions 8, 11, 12 and 13 are conveyed to the microprocessor 62 and used, as described below, in conjunction with microprocessor control of the read timing programmable delay 60 and the write timing programmable delay 76. The write timing programmable delay 76 acts in conjunction with the write power circuitry 78 to raise the power of the laser 51 at a time which will result in a mark being written at the center of a mark position.

Calibration, according to the present invention, includes selecting an initial or "trial" adjustment point setting, comparing signal magnitudes from different mark positions and modifying the adjustment settings using the results of the comparison. In many cases, the calibration also includes comparing signals after such adjustment and making one or more further adjustments. Certain aspects of the calibration will be first described in general terms before describing the specifics of the read, focus and write calibration.

In the preferred embodiment, the initial or trial adjustment point setting is the same every time a particular adjustment point is calibrated. Other possible initial point selections include storing an indication of the last calibrated adjustment point and beginning a new calibration with the last stored calibration point.

The mark positions at which signals are compared can be selected in a number of ways. In general, the selected mark positions for comparison are mark positions whose status (written or unwritten) is known, such as the mark positions in servobytes illustrated in FIG. 1. Although in the preferred embodiment, the compared mark positions are adjacent and on the same track, other calibration schemes using the present invention can include mark positions which are not adjacent or which lie on different tracks.

In the preferred embodiment, the values which are compared are averages of a plurality of signals relating to mark positions. These can be averages of signals from corresponding mark positions in a number of different bytes such as a number of different servobytes, or can be an average of a number of readings or passes across a single byte. It is theoretically possible to perform a calibration using data from a single mark, i.e. without performing averaging, although such a procedure presents many practical difficulties.

The manner in which the initial adjustment point setting or intermediate adjustment point settings are modified at each iteration of the calibration method can be accomplished according to a number of schemes. In the preferred embodiment, each calibration method provides for a finite plurality of possible adjustment settings, preferably with constant intervals therebetween. For the read and write calibration adjustment points, there are preferably 32 adjustment settings spanning a range equivalent to the period between passage of two adjacent mark positions past the focused laser spot, to provide for an adjustment of 1/32 of the period between successive marks. The preferred interval for the focus calibrating is such as to provide for movement of the objective lens in steps of about 0.1 to 0.05 micron. Preferably, sufficient adjustment points or settings are provided to permit a total focus calibration range corresponding to movement of the objective lens of about 1 micron.

When a finite number of possible adjustment settings is available, the possible settings can all be attempted and the most favorable setting, according to a predetermined criterion, can be selected. It is also possible to select an initial setting which is an extreme setting and increment or decrement the setting a predetermined amount at each iteration until a condition is detected such as a change in direction of a trend, e.g. an increase in a parameter followed by a decrease in the same parameter. It is further possible to select the direction and/or amount of adjustment at each next iteration depending on the results of the comparison in the present iteration. For example, the comparison may provide an indication not only of whether proper calibration has been achieved but also an indication of the direction in which the adjustment should be made in order to approach proper calibration. In such a situation, the direction of the adjustment for the next iteration is selected on the basis of the results of the comparison during the present iteration. In some instances, it is possible to also select the amount of adjustment based on the results of the comparison or based on the stage of the iteration, such as when the amount of adjustment is decreased by one-half at each step of the iteration.

The read, focus and write calibrations described below include initial point selections, bit comparison schemes, and adjustments of settings which are preferred. However, alternate schemes including those described above are also operable.

Figure 4A:
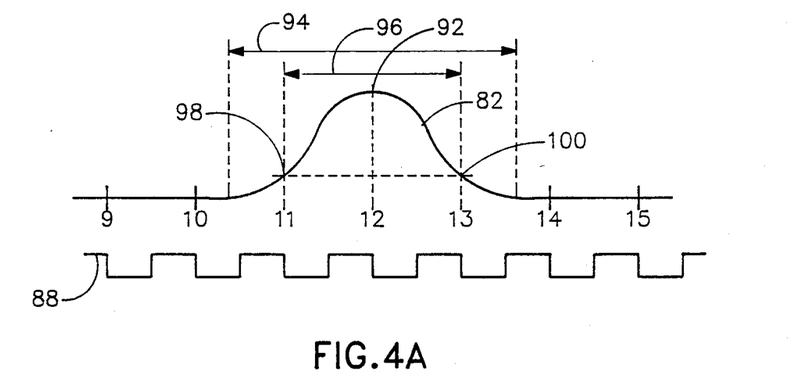
FIG. 4A is a schematic diagram of reflectance from an isolated mark and a properly adjusted read clock signal.

Referring now to FIG. 4A, a signal 82 is depicted which is typical of the signal which would be provided by the read amplifier 54 in response to the read beam from the laser 51 reflecting from mark positions 9-15 of the second servobyte 12 depicted in FIG. 1. The vertical axis of FIG. 4A is arranged such that reflectance is decreasing upward in the figure. The horizontal axis of FIG. 4A represents time and is configured so that time increases towards the right. FIG. 4A depicts the relationship of the read clock signal 88 to the reflectance signal 82 when the clock signal 88 is properly timed with respect to the reflectance signal 82. The clock signal 88 is properly timed when the portions of the clock signal which are designated as indicating bit positions (in this case, falling edges of the clock signal 88) occur simultaneously in time with points of the reflectance signal 82 which corresponds to times when the beam from the laser 51 is centered over mark positions 20-30. Specifically, it will be seen that the reflectance 92 from the laser 51 when the beam is exactly centered over the twelfth mark position 25, 30 occurs simultaneously in time with a falling edge of the read clock signal 88.

Because the shape of the reflectance signal 82 generated by a single mark is gaussian- or normal-shaped, the signal 82 has a symmetric shape. Further, the signal 82 has a detectable width 94 greater than the width 96 between the centers of the outermost of three adjacent mark positions. For these reasons, the reflectance signal 82 has detectable magnitudes 98, 100 at adjacent mark positions 11 and 13 which are equal to each other.

Figure 4B:
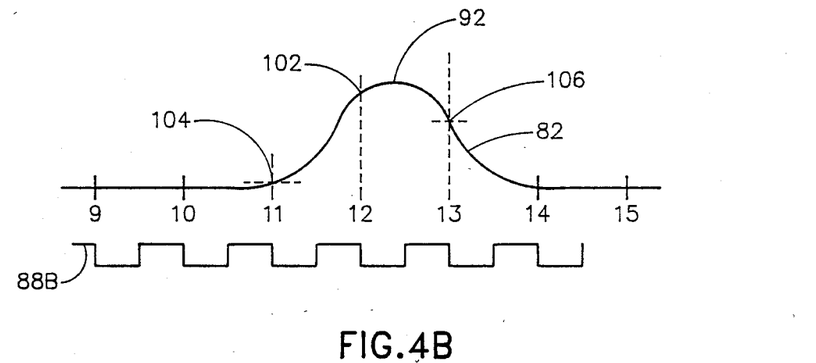
FIG. 4B is a schematic diagram of reflectance from an isolated mark and a read clock signal which is adjusted early.

Referring now to FIG. 4B, a situation is depicted in which the read timing clock signal 88B is adjusted too early, i.e. in which falling edges of the clock signal 88B intended to correspond to times when the beam from the laser 51 falls upon the centers of mark positions, in fact occur earlier than those times. With respect to mark position 12, then, the falling edge of the clock signal 88B intended to correspond to mark position 12 occurs at a time earlier than the time at which the beam from the laser 51 is centered upon mark position number 12. Because of this, the magnitude 102 of the signal 82 which is intended to represent the reflectance at bit position 12 is in fact displaced in time from the maximum 92 of the signal and thus has a magnitude different from the magnitude of the maximum 92 of the signal 82. In terms of the representation of FIG. 4B, because the phase of the clock signal 88B is shifted to the left with respect to the desired clock signal 88 of FIG. 4A, the sampling point 102 along the curve 82 is also shifted to the left with respect to the maximum 92 of mark position 12. Similarly, the reflectances 104, 106 at the falling clock signals intended to correspond to mark positions 11 and 13 are also shifted to the left. Because of this shift, the magnitude of the reflectance signal 104 near mark position 11 will be less than the magnitude of the reflectance signal 106 near mark position 13. Thus, when the magnitude of a reflectance signal 104 intended to correspond to a position preceding an isolated mark is less than the magnitude of a reflectance signal 106 intended to correspond to the mark position following the isolated mark, the clock signal 88B is adjusted to a too-early phase and the phase of the clock signal 88B needs to be shifted so that the falling edges occur at a later time.

Figure 4C:
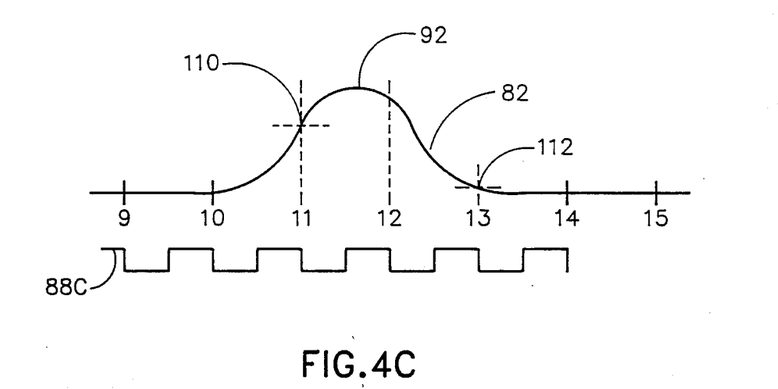
FIG. 4C is a schematic diagram of reflectance from an isolated mark and a read clock signal which is adjusted late.

Referring to FIG. 4C, there is depicted a situation in which the clock signal 88C is configured such that the falling clock edges occur at a times later than those which correspond to the reflectance of the laser beam 51 from the centers of mark positions. Because of this, the magnitude of the reflectance signal 110 intended to correspond to reflectance from the center of a mark position preceding the isolated mark is greater than the magnitude of the reflectance signal 112 intended to correspond to a mark position following an isolated mark. When reflectance at a clock position 110 preceding an isolated mark is greater than reflectance 112 at a mark position following an isolated mark, it can be concluded that the phase of the clock signal 88C is shifted from the desired phase in such a manner that the falling edges occur at a times later than the times corresponding to the beam from the laser 51 falling on the respective centers of mark positions.

By comparing a reflectance value a first predetermined distance in a first direction away from an isolated mark, such as reflectances 98, 104 or 110, with a reflectance a second predetermined distance in a second direction away from the isolated mark, such as reflectances 100, 106 or 112, respectively, it is possible to determine both whether the clock signal 88 is properly adjusted and, if not, the direction in which the phase of the clock signal 88 needs to be shifted in order to approach proper adjustment of the clock signal timing.

According to one specific scheme for calibrating the read timing clock signal, a first clock signal phase for initial testing is selected. The selected phase can be a phase equal to that obtained during the last preceding calibration, can be an extreme phase, i.e. as early as possible or as late as possible, can be a median phase, somewhere between as early as possible and as late as possible, or any other initial phase. Preferably, the initial phase is such that the falling edge intended to correspond to bit number 12 is within a predetermined time interval, such as the interval between adjacent mark positions, of the point 92 on the curve 82 corresponding to the beam from the laser 51 falling on the center of a mark position. The portions of the clock signals intended to represent mark positions immediately preceding and immediately following an isolated mark, such as mark 12 of the second servobyte 12 are used to obtain values for reflectances simultaneous with such clock signals. Preferably, a number of values are averaged to obtain an average value for reflectance at times intended to correspond to mark positions preceding the isolated mark and at times intended to correspond to mark positions following an isolated mark. An average of 256 samples has been found to be operative, although averages of other numbers of samples could also be used. A calibration based on a single sample is also theoretically possible. The samples can represent readings taken at a plurality of servobytes or a plurality of readings at a single servobyte or any combination thereof.

The average for the preceding and following bits are then compared. If the reflectance values are approximately equal, i.e. the difference is less than a predetermined maximum difference, then the read timing clock signal 88 can be considered to be properly adjusted. The predetermined maximum can be selected, for example, to correspond to the difference in magnitude that would be expected when the phase of the clock signal 88 is out of adjustment less than an amount which can be accurately corrected, e.g. less than an amount corresponding to a single delay line tap. If the preceding mark position reflectance average is less than the average reflectance for the following mark positions, the phase of the clock signal 88B is shifted by adjusting the programmable delay 60 in such a direction that the clock signals fall at later points in time. Similarly, if the preceding mark position average reflectance is greater than the following mark position average reflectance, the clock signal 88C is shifted so that the falling edges occur at points earlier in time.

The amount of adjustment of the phase, either earlier or later can be determined in a number of fashions. When the number of possible adjustments is small, for example when only a small number of taps from a delay line can be utilized, it is preferred to adjust the phase by an amount corresponding to selecting the next-earlier or next-later delay line tap. When a larger number of adjustments are possible, the amount of adjustment can correspond to a predetermined time difference, can correspond to a time difference which decreases at each iteration of the calibration, or can correspond to a time difference which is calculated using the magnitude of a difference between the preceding mark position average and the following mark position average magnitudes.

After the above-described first adjustment of the read clock phase, the process is repeated, again obtaining an average of reflectances at preceding mark positions and following mark positions, this time with the reflectances obtained according to the falling edges of the adjusted clock signal. The read clock phase is then adjusted according to this comparison, in the manner described above. The process can be repeated until a condition is detected which indicates that proper adjustment (within a predetermined tolerance) has been achieved. As noted above, this condition can include a difference between the preceding mark position and following mark position averages which is less than a predetermined maximum value. Alternatively, it is possible to begin the calibration with the clock phase at an extreme position and to step through or test all possible clock adjustments until it is determined that an acceptable clock phase has been obtained. Such determination can be made on the basis that the sign of the adjustment has changed, i.e. the clock signal has changed from a phase which is too early to a phase which is too late (or vice versa) or can be based on a determination that the difference of signal magnitudes between the preceding and following mark position is increasing, i.e. that further adjustments will make the clock phase 88 farther away from the preferred or desired clock phase.

Figure 5A:
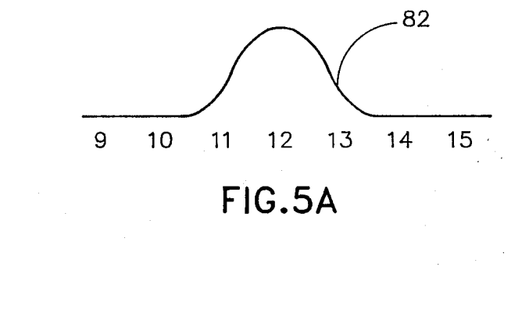
FIG. 5A is a schematic diagram of reflectance from an isolated mark when the system is properly focused.
Figure 5B:
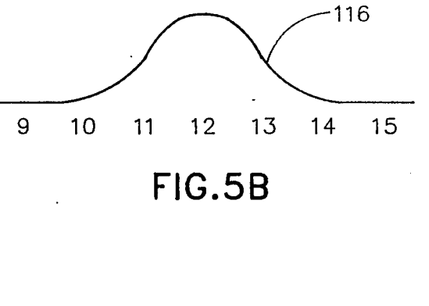
FIG. 5B is a schematic diagram of reflectance from an isolated mark when the system is out of focus.

Referring now to FIG. 5A, there is depicted a reflectance signal 82 generated by an optics assembly 54 in which the beam from the laser 51 is properly focused on the disk 50. By way of comparison, FIG. 5B schematically depicts the shape of a signal 116 when the beam from the laser 51 is not properly focused on the disk 50. The wave-shapes of the signals 82 and 116 depicted in FIGS. 5A and 5B respectively are not intended to depict precise configurations of in-focus out-of-focus reflectances but are intended to schematically represent the differences in wave-shapes. Specifically, the wave-shape generated in the out-of-focus condition is broader, i.e. has a greater detectable or effective width, compared to the wave-shape generated by an infocus system. Because of the differences in the wave-shapes, it is possible to evaluate the focus condition using a comparison of reflectances at an isolated mark and a reflectance from a position removed from the isolated mark. The magnitude of reflectance from the peak of the curve will be higher in an in focus condition 82 than an out of focus condition 116. Although it is theoretically possible to determine an in-focus condition by determining this difference, in practical terms, the difference has been found to be small and it is therefore preferred to determine focus condition by determining the slope of a portion of the curves 82, 116. Particularly, with reference to FIGS. 5A and 5B, when the system is in focus, the slope of a portion of the reflectance curve 82 (at non-critical points) will be larger than the slope of the corresponding portion of the curve 116 when the system is out of focus.

One manner of determining the slope of the curves 82, 116 is to determine the magnitude of reflectance at 2 points along the curve separated by a known time difference. The known time difference is conveniently the period of the read clock signal, and thus is conveniently a time corresponding to the distance between 2 mark positions. In the preferred embodiment, the mark positions are adjacent and at least one mark position is position 12, near the peak of the curve 82, 116. Since it is possible to obtain a more accurate focus when one of the mark positions centers is close to the peak of the curves 82, 116, it is particularly preferred to conduct the focus calibration after the above-described read timing calibration has been conducted. In this way, the reflectance signal corresponding to mark position 12 will be obtained at a point along the track or path which is in the vicinity of the center of the mark, i.e. no more than a maximum tolerable distance from the center. For a similar reason, the path which the focused light spot defines on the disk should pass through or very close to (i.e. no more than a maximum tolerable distance from) the center of the mark. In each case, the maximum tolerable distance is a distance beyond which accuracy of slope determination (and thus accuracy of focus calibration) is seriously degraded.

In the preferred embodiment, the detectable width of the in-focus reflectance curve 82 is somewhat larger than 2 clock periods in width and preferably less than 4 clock periods in width. For this reason, it is preferred to use, as the second mark position, a mark position adjacent to the isolated mark position, such as mark position 11 or mark position 13 in FIGS. 5A and 5B.

Thus, the preferred manner of obtaining an indication of the slope is to obtain the difference between the reflectance at the read clock falling edge corresponding to mark position 12 and the reflectance at the read clock falling edge corresponding to an adjacent mark position, e.g. mark position 11 or 13. Preferably, in making this and below-described determinations of mark position 12 and adjacent mark position reflectances, a number of reflectance values are obtained and averaged, similarly to the averaging described above in connection with the read timing calibration.

Once an indication of slope is obtained, e.g. by obtaining the difference between reflectance in the vicinity of mark position 12 and reflectance in the vicinity of adjacent mark positions 13 or 11, the slope indication can be used to determine the degree of fineness of focus. The degree or fineness of focus can be determined by comparing the reflectance difference to either a predetermined value or to a difference obtained under a second focus condition. The predetermined value can be a value which has been found, either theoretically or by experience, to indicate an in-focus condition. However, in practice such comparison to a pre-determined value is prone to error because of variations among disk surfaces, mark sizes and the like. Therefore, it is preferred to determine fineness of focus by changing the focus condition to a second state and repeating determination of the slope. In this way, if the comparison using a first focus condition yields an indication of a smaller slope than that using a second focus condition, focus can be corrected by changing the focus in the direction from the first focus condition towards the second focus condition. On the other hand, if the slope using the first focus condition is greater than the slope using the second focus condition, focus can be corrected by changing the focus in the direction from the first focus condition away from the second focus condition. Thus, comparison of slope indications under two focus conditions allows the determination of the direction in which the focus correction should be made.

Once the determination of focus correction direction is made, the amount of focus correction is determined. The amount of focus correction which is used can be selected in a number of fashions. In the preferred embodiment, the focus correction is a predetermined amount in each iteration. When only a finite number of focus positions are possible, the focus condition can be changed to the next sequential focus condition and the slope determination process can be repeated. The amount of focus condition can also be selected depending on the magnitude of the difference under the two focus conditions. The amount of focus adjustment can be changed at each iteration by a predetermined amount, for example, by making the amount of adjustment at each iteration equal to ½ of the amount of adjustment used in the preceding iteration (with the first iteration using a predetermined amount of focus adjustment). It has been found that when the focus is close to being in adjustment, the amount of difference between successive focus adjustments can be small and may be less than the effective resolution of the system. In such a situation, it is preferred that the amount of focus adjustment at each iteration not be allowed to decrease beyond a certain minimum focus adjustment amount.

Once the direction and amount of focus adjustment are determined, the focus is adjusted and a new slope indication or difference is obtained. This new difference is compared to the previous difference, i.e. the difference under a third focus condition is compared with the difference under the second focus condition. This comparison is used to determine the direction and amount of focus adjustment needed. The process is continued until a condition indicating an acceptable focus condition is detected. A number of conditions can indicate an acceptable focus condition. One indication is a slope indication or difference which is greater than a predetermined amount (obtained theoretically or on the basis of experience). Another focus indication is the determination that any change in focus, in either direction results in a slope indication which is less than the present slope indication, i.e. that any change from the most recent iteration makes the focus worse. Another focus indication is that the sign of changes in the focus slope indicator has changed, i.e. when moving in a single focus change direction, the slope indicator becomes larger at each iteration followed by an iteration at which the slope indicator becomes smaller. In such a situation, the penultimate focus condition can be considered to be an in-focus condition. When a scheme, as described above, is used in which the amount of focus adjustment at each iteration is decreased, another focus indication is that the amount of adjustment is less than a predetermined minimum amount.

Figure 6A:
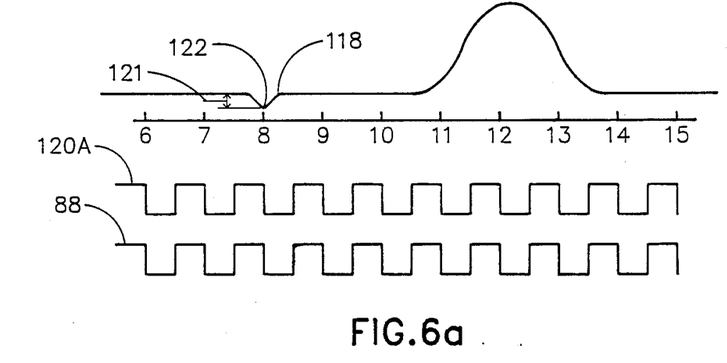
FIG. 6A is a schematic diagram of reflectance of a write pulse and read and write clock signals when both are properly adjusted.

Referring now to FIG. 6A, there is depicted a reflectance curve 118 generated by a low-intensity write pulse. Preferably, the write pulse is generated by the laser 51 in the same fashion as the read beam, but at a higher intensity than the read beam. The timing of initiation of the higher-intensity pulse is, as described above, controlled by the write power circuitry 78 and the programmable delay 76. The write power circuitry 78 generates a signal to initiate a write-intensity pulse at a time determined by a write clock signal 120A. The write clock signal 120 provides clock signals such as falling edges which control the initiation of the write pulse. The clock signal 120 depicted in FIG. 6A is shown as having falling edges corresponding to the mark positions as determined by the read clock, i.e. having falling edges corresponding to the falling edges of the read timing clock 88. This depiction is used to schematically represent a write clock signal 120A whose phase is properly adjusted with respect to the read clock signal 88. However, the actual initiation of the write intensity laser which is desired may occur at some different time because, e.g., there is some time delay between the initiation signal for the write pulse and the achievement of the desired write intensity level at the surface of the disk 50. Because the read calibration adjustment described above can be used to calibrate the read timing clock to the center of mark positions on the disk, the read timing clock, in turn, is useful in conjunction with providing calibration for the write timing clock signal 120. For this reason, it is preferred to conduct the write timing calibration after conducting the read timing calibration.

In general terms, the write timing calibration is accomplished by selecting an initial or test phase for the write timing clock signal 120, generating a write pulse in accordance with such write clock signal 120 and determining whether the maximum intensity of the write pulse at the disk occurs simultaneously with a falling edge of the read clock signal. If such simultaneity is not detected, the phase of the write timing clock signal 120 is adjusted, as described below, and another write pulse is generated with timing corresponding to the adjusted clock signal 120. The process of testing a write clock signal phase and adjusting the phase is repeated or iterated until an acceptable write clock signal phase is achieved. In order to detect reflectance from the write beam, the beam should be emitted over a portion of the disk 50 which is not written, i.e. which does not contain a mark, such as within a maximum tolerable distance of the center of mark position 8 of the first servobyte 10 depicted in FIG. 1. Preferably, adjacent bits, such as bits 7 and 9 of the first servobyte 10, are also nonwritten, i.e. without marks.

The intensity of the write pulse which is used during a calibration is preferably a reduced-intensity write pulse, i.e. a write pulse which does not have the intensity which is normally used during writing of data to the disk 50. A reduced-intensity write pulse is used during calibration because a full intensity write pulse provides a large reflectance from the disk 50 and such large reflectance exceeds the dynamic range of the light detectors used to determine the amount of reflectance from the disk, i.e. the light detectors would become saturated in response to a high-intensity write pulse and thus accurate determination of reflectance from the disk during the write cycle would be impaired or made impossible. Further, it is desired to avoid a write pulse intensity during calibration which would actually result in writing a mark to the disk.

Figure 6B:
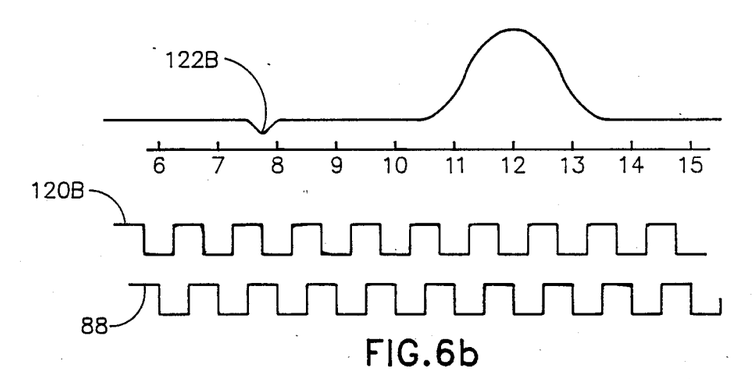
FIG. 6B is a schematic diagram of reflectance of a write pulse, a properly-adjusted read clock signal and a write clock signal which is adjusted early.

As depicted in FIG. 6A, reflectance is indicated as decreasing upward and thus the increased reflectance at mark position 8 is shown as a trough 122. As best seen in FIG. 6A, the width of the trough 122, particularly when a low-intensity write beam is used, is narrow. In practice, the width of the trough 122 is much less than the width between 2 clock edges and, in the preferred embodiment is about ⅓ of the width between two clock edges. Because of the relatively narrow width of the trough 122, when the write timing signal 120B occurs early, as depicted in FIG. 6B, the trough 122B will occur prior to the falling edge of the read clock signal 88 corresponding to mark position 8 and furthermore the width of the signal or trough 122B is sufficiently narrow that little or no detectable signal is obtained by the reflectance detector at mark position 8 or at adjacent mark positions 7 or 9. Similarly, when the write timing signal 120C occurs late, the trough 122C occurs after the falling edge of the read clock signal 88 corresponding to bit number 8.

Figure 6C:
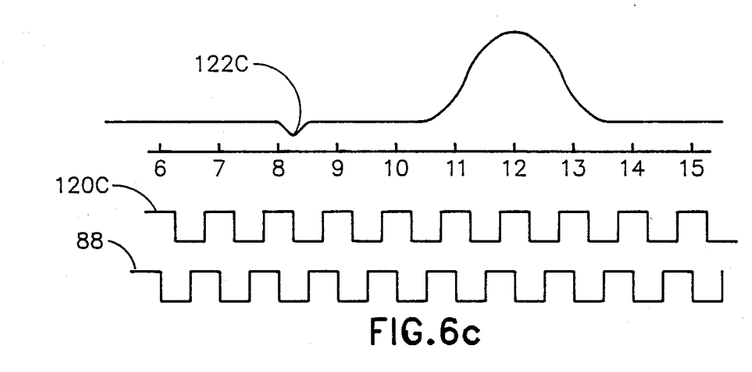
FIG. 6C is a schematic diagram of reflectance of a write pulse, a properly-adjusted read clock signal and a write clock signal which is adjusted late.

As can be seen from FIGS. 6A, B and C, the occurrence of a trough 120 simultaneously with the occurrence of a read clock signal edge is taken as an indication that the phase of the write timing clock 120 is properly adjusted with respect to the phase of the read clock signal 88. Since, in most practical systems, the width of the write timing trough 120 will be too narrow to provide any detectable reflectance at adjacent bit positions 7 or 9. The preferred manner of calibrating the write timing is to select an initial write clock signal phase which has one of two extreme values, i.e. such that the falling edge intended to correspond to mark position 8 in fact is positioned in the vicinity of mark position 7 or mark position 9, and preferably no more than a predetermined time interval, such as the interval between adjacent mark position, from the center of the mark position 8 (according to the read circuitry). The write pulse is activated according to the write timing clock signal 120 and the read circuitry (including the read clock signal 88) is used to determine the amount of reflectance at mark position 8. Preferably, in making this and the belowdescribed determinations of mark position 8 reflectance, a number of reflectance values are obtained and averaged, similarly to the averaging described above in connection with the read and focus calibrations. The write timing phase is then adjusted by predetermined amount, preferably the smallest phase adjustment possible, such as by selection of the next-adjacent delay line tap. Adjustment is made in a direction towards the other of the extreme configurations of the write clock signal phase. The write pulse is again initiated in accordance with the adjusted write clock signal 120 and the magnitude of reflectance at mark position 8 (according to the read timing clock signal) is determined. The process is continued, adjusting the write clock phase a predetermined amount at each iteration and determining the average reflectance at mark position 8 until a condition is detected which indicates that an acceptable write clock signal phase adjustment has been obtained. The acceptable phase adjustment may not be equal to a theoretically perfect phase adjustment but will be within a minimum tolerance, such as tolerance equal to the period between adjacent phase adjustment amounts.

A number of conditions can be used as an indication that acceptable write clock signal phase adjustment has been achieved. A reflectance which is greater than a predetermined amount, calculated theoretically or determined empirically, can be used. With reference to FIG. 6A, the magnitude 121 can serve as an indication of acceptable write clock signal phase adjustment. However, because the amount of reflectance varies depending on such factors as laser write intensity and disk medium reflectance, it is preferred to use as a criterion for acceptable write clock phase adjustment that the average reflectance at mark position 8 is larger than reflectance at mark position 8 under other write phase adjustments. For example, if the amount of reflectance under a given phase adjustment is greater, such as by a predetermined amount, than the reflectance under both the preceding phase adjustment and the following phase adjustment, (or greater than under all other available phase adjustments) then the given phase adjustment can be taken as an acceptable phase adjustment. A change in the sign of the change of reflectance between succeeding phase adjustments can also be taken as an indication of proper adjustment. For example, where adjustments are always made in the same direction, if two successive adjustments each provide an increase in reflectance (as compared to the respective previous adjustments) and the next following adjustment provides a decrease in reflectance, the higher (i.e. more reflective) of the two increasing-reflectance adjustments can be taken as an acceptable write phase adjustment. In the preferred embodiment, each write phase adjustment corresponds to a change of one tap position in the delay line and adjustment is continued until a maximum reflectance (as determined by a drop in reflectance in the next succeeding adjustment) is achieved.

A number of variations and modifications of the embodiments described above can also be used. Comparisons of signal magnitudes at adjacent mark positions also be achieved by making comparisons of signals at positions other than at adjacent mark positions, provided the wave shape of the signal is sufficiently wide to provide a useful signal at such other positions. The general method of calibration by comparing signal magnitudes at times determined by a clock signal can be used to calibrate other aspects of the system such as tracking, laser intensity, and disk rotation speed. Although the system was described in the context of a data recording system which relies on creation of decreased reflectance marks in the medium for recording of data, the invention can be used in connection with other data recording/reading schemes including schemes for writing bits by creating raised portions in the medium, magneto-optic recording systems and two-sided disk systems.

Although in the preferred embodiment both the focus calibration and the write timing calibration are conducted after the read timing calibration, other orders of calibration are theoretically possible. Further, it is not necessary that all three calibrations be conducted at any given instance. Although the hardware, such as that depicted in FIG. 3, which is described as being used in conjunction with the present invention is preferred, other hardware including hardwired circuitry in place of the microprocessor 62 can be used.

Based on the foregoing detailed discussion of the invention, a number of advantages of the invention are easily seen. The present invention can be used to calibrate aspects of an optical disk system including read timing, focus and write timing in an automatic fashion, i.e. without the need for the skill or judgment of a trained technician, and specifically can be done in a mechanized fashion, preferably using hardware which is provided in the system for other uses such as reading data. The invention avoids the necessity for using relatively expensive analog-based hardware such as sample and hold apparatus and high speed comparators and also avoids inaccuracies such as offset errors and droop errors which are associated with analog apparatus. The invention allows calibration to be based on average readings from a number of parts of the disk or from a number of readings of the disk, thus increasing accuracy. Because the calibration can be done automatically, it can be done on a frequent, periodic and/or as-needed basis.

Although the present invention has been described with reference to certain embodiments, it should be appreciated that further modifications can be effected within the spirit and scope of the invention.

What is claimed is:

1. A method for adjusting the timing of data extraction from a read signal in an optical disk system comprising:
   (a) providing an optical disk having at least one mark having a center written on said optical disk;
   (b) providing a light source which is caused to impinge on substantially the center of said mark at a first point in time;
   (c) generating a periodic clock signal having an adjustable phase which defines a second point in time within a first time interval of said first point in time;
   (d) obtaining a first value related to a magnitude of the read signal at a third point in time previous to said second point in time;

(e) obtaining a second value relating to a magnitude of the read signal at a fourth point in time subsequent to said second point in time;
(f) obtaining a third value related to the difference of said first value and said second value; and
(g) using said third value in adjusting the phase of said periodic clock signal.

2. A method, as claimed in claim 1, wherein said step of using comprises:
changing said phase of said signal by an amount which depends on whether said first value is greater than said second value or said second valve is greater than said first value; and
repeating said steps (a) through (g) until the sign of said third value is reversed.

3. A method, as claimed in claim 1, wherein:
at least one of said first value and said second value is a value related to an average of a plurality of signal magnitudes.

4. A method, as claimed in claim 1, wherein:
said second point in time is about midway between said third point in time and said fourth point in time.

5. A method for calibrating the focus of an optical beam in an optical disk system having a controllable focus system and at least one mark having a center written on the disk comprising:
(a) directing a light beam through said adjustable focus system to impinge on said disk, defining a substantially circumferential path of said impingement, said path being no more than a maximum tolerable distance from the center of the mark;
(b) obtaining a first value related to the reflectance of said beam at a point along said path in the vicinity of said center of said mark;
(c) obtaining a second value related to reflectance a first distance in a first direction away from said mark;
(d) obtaining a third value related to the difference between said first value and said second value; and
(e) using said third value to adjust said adjustable focus system by a focus adjustment amount.

6. A method as claimed in claim 5, wherein said step of using said third value comprises:
(i) changing said adjustable focus system by a predetermined amount;
(ii) obtaining a fourth value related to the reflectance of said beam at a point along said path in the vicinity of said mark;
(iii) obtaining a fifth value related to reflectance at a point spaced from said mark;
(iv) obtaining a sixth value related to the difference between said fourth value and said fifth value;
(v) comparing said third value and said sixth value; and
(vi) determining an amount of focus adjustment wherein said amount is equal to a first amount when said third value is greater than said sixth value and said focus adjust amount is equal to a second amount different from said first amount when said third value is less than said sixth value.

7. A method, as claimed in claim 6, further comprising:
repeating steps (a) through (e) a plurality of times.

8. A method, as claimed in claim 6, further comprising:
selecting an adjustment amount less than or equal to any previous adjustment amount; and
repeating steps (a) through (e) at least until said adjustment amount is less than a predetermined value.

9. A method, as claimed in claim 6, wherein:
said first direction is along said path.

10. A method, as claimed in claim 5, wherein:
at least one of said first value and said second value is a value related to an average of a plurality of reflectances.

11. A method, as claimed in claim 5, further comprising:
obtaining a first signal related to the focus condition of said light beam with respect to said disk;
generating an offset signal using said third value;
adding said first signal to said offset signal to obtain a focus control signal; and
using said focus control signal to control said controllable adjustable focus system.

12. A method for obtaining timing calibration of a write pulse to within a minimum tolerance with respect to timing of a read circuit in an optical disk system, comprising:
(a) providing an optical disk having at least one unwritten mark position having a center;
(b) providing a light source for impingement of light on said disk wherein light from said light source can be pulsed at a desired power level, the timing of said pulsing being controllable by a write delay, said write delay being adjustable to any of a plurality of delay amounts;
(c) setting said adjustable write delay to a first value;
(d) using said write delay set at said first delay value to pulse said light source to impinge on said disk no more than a first distance from the center of said unwritten mark position wherein said light source is pulsed at a power level sufficiently low that there is no writing of a mark;
(e) using the read circuit to obtain a first quantity related to the reflectance of said pulsed light;
(f) setting the amount of delay of said write delay to a second value different from said first value;
(g) using said write delay set at said second delay value to pulse said light source wherein said light source is pulsed at a power level sufficiently low that there is no writing of a mark;
(h) using said read circuit to obtain a second quantity related to the reflectance of said pulsed light; and
(i) using at least said first quantity and said second quantity to determine whether said write beam has been calibrated to within the minimum tolerance.

13. A method, as claimed in claim 12, further comprising:
(j) setting the amount of delay of said write delay to a value different from said first value and said second value;
(k) using said write delay set at said delay value to pulse said light source wherein said light source is pulsed at a power level sufficiently low that there is no writing of a mark;
(l) using the read circuit to obtain a determined quantity related to the associated reflectance of said pulsed light;
(m) using at least said determined quantity to determine whether said write beam has been calibrated to within the minimum tolerance.

14. A method, as claimed in claim 13, further comprising:

repeating steps (j) through (m) until said write beam has been calibrated to within the minimum tolerance.

15. A method, as claimed in claim 13, further comprising:
repeating steps (j) through (m) until substantially all of said plurality of delay amounts have been used to pulse said light source; and
selecting a delay amount wherein said associated reflectance is greater than the associated reflectance for substantially all other delay amounts.

16. A method, as claimed in claim 13, further comprising:
repeating steps (j) through (m) until there is a reversal or the sign of changes in said associated reflectance.

17. A method, as claimed in claim 12, wherein:
at least one of said first quantity and said second quantity is a quantity related to an average of a plurality of reflectance values.

18. A method as claimed in claim 12, wherein:
said minimum tolerance is substantially equal to one of said plurality of delay amounts.

19. A method of conducting read, focus and write calibration in an optical disk system for reading and recording marks along a circumferential path comprising:
adjusting a programmable read delay circuit in response to a first value related to reflectance at a point along the path preceding a first mark and a second value related to reflectance at a point along the path following said first mark;
performing a focus calibration by adjusting a focus in response to a difference between reflectances in the vicinity of a second mark and at an adjacent location spaced from said second mark; and
conducting a write calibration by repeatedly adjusting a programmable write delay circuit at least until a reflectance value is obtained by a read circuit which is greater than a reflectance value obtained using least one other delay circuit adjustment.

20. A method, as claimed in claim 19, wherein:
said focus calibration is conducted after said read calibration; and
said write calibration is conducted after said read calibration.

21. A method, as claimed in claim 20, wherein:
said write calibration is conducted after said focus calibration.

22. A method, as claimed in claim 19, wherein:
said step of performing a focus calibration comprises obtaining a reflectance value of a point along said path substantially at the center of a mark position which is adjacent to said second mark.

23. A method, as claimed in claim 19, wherein:
said step of conducting a write calibration comprises repeatedly adjusting a programmable write delay circuit providing a plurality of delay values until a reflectance value is obtained which is greater than reflectance values obtained using all others of said plurality of delay values.

24. A method for automatically calibrating an adjustable calibration point for at least one of a read clock delay, a write clock delay, and an adjustable focus in an optical disk system having a disk for reading and recording marks at a plurality of mark positions, said calibration occurring after substantially each activation of the system and prior to each initial access of the system by the user, the method comprising:
detecting the occurrence of activation of the system;
calibrating said adjustment point after said detection of activation by a method comprising:
obtaining a first value related to reflectance in the vicinity of a mark position on the disk;
obtaining a second value related to reflectance in the vicinity of a mark position on the disk;
obtaining a third value related to the difference between said first value and said second value; and
determining whether the adjustable calibration point is adjusted to within a calibration criterion using said third value.

25. Apparatus for adjusting the timing of data extraction from a read signal in an optical disk system comprising:
an optical disk having at least one mark having a center written thereon;
a light source controllable to cause a light beam to impinge on substantially the center of said mark at a first point in time;
a clock circuit for generating a periodic signal having an adjustable phase which defines a second point in time within a first time interval of said first point in time;
means for obtaining at least first and second values, said first value being related to a magnitude of the read signal at a third point in time previous to said second point in time and said second value related to a magnitude of the read signal at a fourth point in time subsequent to said second point in time;
means for obtaining a third value related to the difference of said first value and said second value; and
means for adjusting the phase of said clock using said third value.

26. Apparatus, as claimed in claim 25, wherein:
said means for adjusting comprises a programmable delay circuit.

27. Apparatus for focusing light onto an optical disk having at least one mark having a center written thereon comprising:
an adjustable focus system;
a light source for providing a light beam;
means for directing said light beam through said adjustable focus system to impinge on said disk along a substantially circumferential path of impingement, said path being no more than a maximum tolerable distance from the center of the mark;
means for obtaining a first value related to the reflectance of said beam at a point along said path in the vicinity of said center of said mark;
means for obtaining a second value related to reflectance a first distance in a first direction away from said mark;
means for obtaining a third value related to the difference between said first value and said second value; and
means for adjusting said adjustable focus system using said third value.

28. Apparatus, as claimed in claim 27 further comprising:
means for obtaining a first signal related to the focus condition of said light beam with respect to said disk;
means for generating an offset signal using said third value; and wherein:

said adjustable focus system comprises an electrically controllable objective lens, and said means for adjusting comprises means for adding said first signal to said offset signal to obtain a focus control signal and means for controlling said electrically controllable objective lens using said focus control signal.

29. Apparatus for obtaining timing calibration of a write pulse to within a minimum tolerance with respect to timing of a read circuit in an optical disk system comprising:

an optical disk having at least one unwritten mark position having a center;

a light source for impingment of light on said disk wherein light from said light source can be pulsed at a desired power level, the timing of said pulsing being controllable by a write delay, said write delay being adjustable to any of a plurality of delay amounts;

means for setting said write beam delay amount to a first value;

means for pulsing said light source to impinge on said disk a first distance from the center of said unwritten mark position using said write delay set at said first delay value wherein said light source is pulsed at a power level sufficiently low that there is no writing of a mark;

means for obtaining a first quantity related to the reflectance of said pulsed light using the read circuit;

means for setting the amount of delay of said write delay to a second value different from said first value;

means for pulsing said light source using said write delay set at said second delay value wherein said light source is pulsed at a power level sufficiently low that there is no writing of a mark;

means for obtaining a second quantity related to the reflectance of said pulsed light using the read circuit; and means for determining whether said write beam has been calibrated to within minimum tolerance using at least said first quantity and said second quantity.

* * * * *